US010244270B2

United States Patent
Behbahani

(10) Patent No.: US 10,244,270 B2
(45) Date of Patent: Mar. 26, 2019

(54) DETERMINING INITIAL BIT RATE FOR ADAPTIVE BIT RATE VIDEO PLAYBACK

(71) Applicant: Amazon Technologies, Inc., Seattle, WA (US)

(72) Inventor: Aurash Steven Abnar Behbahani, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 289 days.

(21) Appl. No.: 14/668,789

(22) Filed: Mar. 25, 2015

(65) Prior Publication Data

US 2016/0285939 A1 Sep. 29, 2016

(51) Int. Cl.
| | |
|---|---|
| *G06F 15/16* | (2006.01) |
| *H04N 21/2225* | (2011.01) |
| *H04L 29/06* | (2006.01) |
| *H04L 29/08* | (2006.01) |
| *H04N 21/2343* | (2011.01) |
| *H04N 21/262* | (2011.01) |
| *H04N 21/2662* | (2011.01) |
| *H04N 21/442* | (2011.01) |
| *H04N 21/482* | (2011.01) |
| *H04N 21/6373* | (2011.01) |
| *H04N 21/845* | (2011.01) |

(52) U.S. Cl.
CPC ....... *H04N 21/2225* (2013.01); *H04L 65/601* (2013.01); *H04L 67/32* (2013.01); *H04N 21/23439* (2013.01); *H04N 21/2662* (2013.01); *H04N 21/26258* (2013.01); *H04N 21/44209* (2013.01); *H04N 21/4825* (2013.01); *H04N 21/6373* (2013.01); *H04N 21/8456* (2013.01)

(58) Field of Classification Search
CPC ............. H04N 21/2225; H04N 21/24; H04L 67/1029; H04L 67/1012; H04L 43/0876; G06F 17/30867; G06F 17/30905
USPC .................................................. 709/219, 224
See application file for complete search history.

(56) References Cited

U.S. PATENT DOCUMENTS

2010/0306373 A1* 12/2010 Wormley ............ H04L 67/1029
709/224
2012/0265856 A1* 10/2012 Major ................ H04N 21/2225
709/219

(Continued)

FOREIGN PATENT DOCUMENTS

WO  WO 2016/154189  9/2016

OTHER PUBLICATIONS

PCT International Search Report and Written Opinion dated May 27, 2016 issued in PCT/US2016/023556.

(Continued)

*Primary Examiner* — Kyung H Shin
(74) *Attorney, Agent, or Firm* — Weaver Austin Villeneuve & Sampson LLP

(57) ABSTRACT

Enhancements to adaptive bit rate techniques are described that relate to selection of the initial bit rate with which video content is delivered. The bandwidth available to a client device is estimated by determining the time required by the client device to download a specific amount of content, e.g., the "above-the-fold" portion of a requested web page. An initial bit rate is selected for video content associated with the page that is within the estimated available bandwidth.

20 Claims, 4 Drawing Sheets

(56) References Cited

U.S. PATENT DOCUMENTS

2013/0007263 A1* 1/2013 Soroushian ............. H04L 47/12
709/224
2014/0344727 A1* 11/2014 Chaudhry ......... G06F 17/30867
715/760

OTHER PUBLICATIONS

PCT International Preliminary Report on Patentability dated Oct. 5, 2017 issued in PCT/US2016/023556.
European Office Action dated Jul. 16, 2018 issued in EP Application No. 16 716 987.9-1209.

* cited by examiner

DETERMINING INITIAL BIT RATE FOR ADAPTIVE BIT RATE VIDEO PLAYBACK

BACKGROUND

The delivery of video content over the Internet is facilitated by adaptive bit rate techniques that respond to network conditions and device capabilities to provide users with the best or at least a consistent experience within currently available bandwidth. Selection of the initial bit rate for such techniques can be a difficult problem. If the initial bit rate exceeds currently available bandwidth, buffering delays may occur. If the initial bit rate is too low, the visual quality of the video content may be unacceptably low for a period of time; a serious issue for short-form videos.

DETAILED DESCRIPTION

This disclosure describes enhancements to adaptive bit rate techniques that relate to selection of the initial bit rate with which video content is delivered. The bandwidth available to a client device is estimated by determining the time required by the client device to download a known amount of content, e.g., the "above-the-fold" portion of a requested web page. Based on this determination, an initial bit rate is selected for video content associated with the page that is within the estimated available bandwidth. An example may be instructive.

Figure 1:
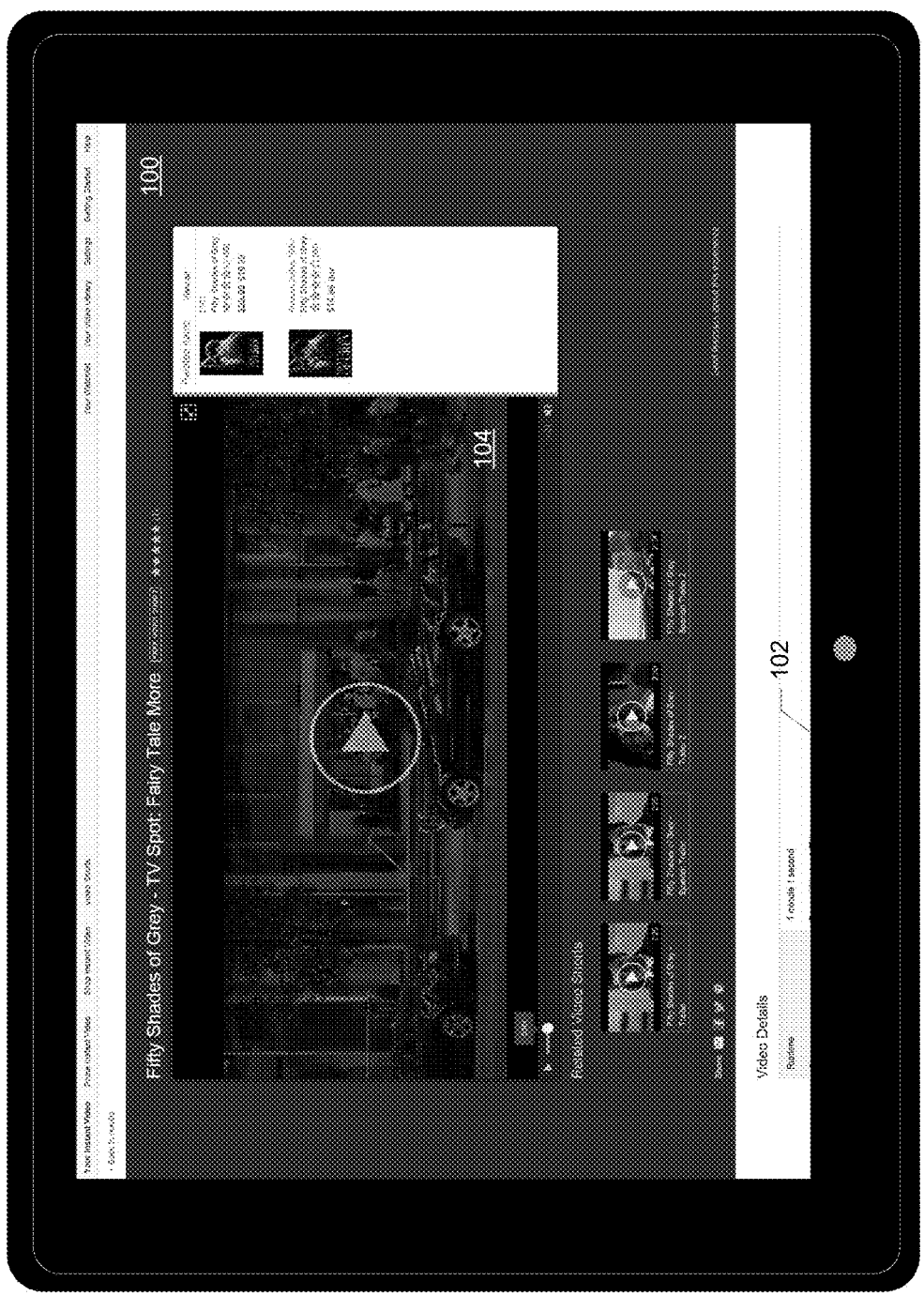
FIG. 1 illustrates the display of "above-the-fold" content on a client device.

The user of a tablet device might select a link to a web page that includes embedded video content. An example of such a page is the home screen 100 of a video-on-demand service as shown in FIG. 1. As can be seen from the figure, the requested page includes content that extends below the visible edge 102 of the content that is initially presented on the tablet's display, i.e., "below-the-fold" content. The initially displayed content, i.e., the "above-the-fold" content, includes a static image 104 where the video content (in this case a movie preview) will eventually be presented.

The above-the-fold portion of the page is downloaded relatively quickly and presented before video playback begins. The time required to download the above-the-fold portion of the page can be used to estimate the bandwidth that is currently available to the tablet. That is, above-the-fold content is represented by a known or determinable number of bits which, when divided by the download time, represents an estimate of available bandwidth. The initial bit rate with which the video content (e.g., in place of image 104) is then streamed or downloaded is selected (e.g., by the tablet's media player) to be within this constraint. This helps to ensure that the initial quality of the delivered video more closely matches current network conditions than approaches in which the initial bit rate is fixed or arbitrarily selected.

An important use case for such techniques is in the context of the playback of short-form video content. Such content might include, for example, video advertising content integrated with web pages, video content shared through social media, movie previews, etc. Because short-form video content typically has a relatively short duration (e.g., a few seconds or less and typically less than 15 minutes), it is important to select an initial bit rate that ensures a sufficiently high initial visual quality. If the initial bit rate is too low, a typical adaptive bit rate algorithm might not converge quickly enough to an acceptable visual quality.

Figure 2:
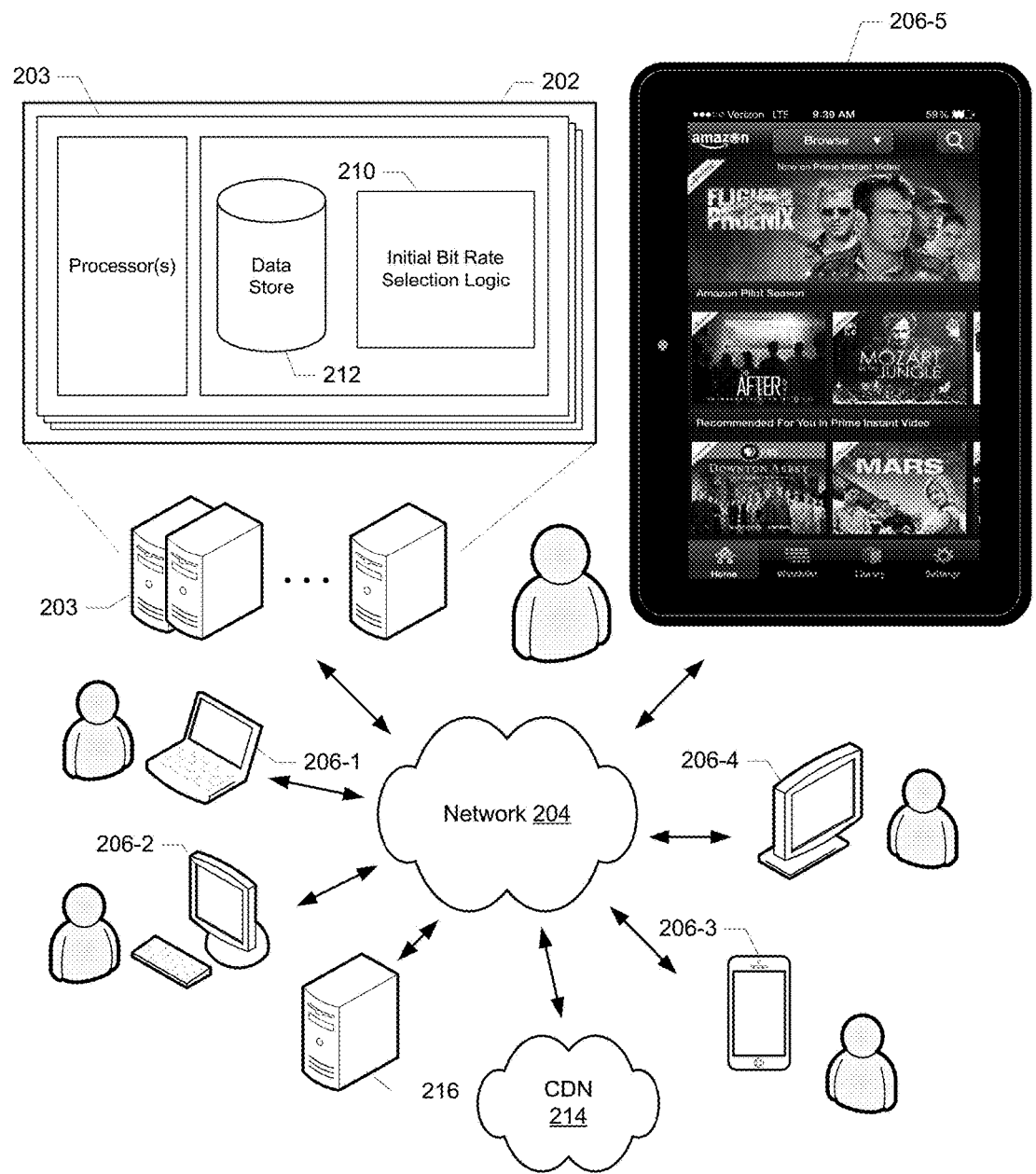
FIG. 2 is a simplified diagram of an example of a network computing environment in which various implementations may be practiced.

FIG. 2 illustrates an example of a computing environment in which a video content service 202 provides content via network 204 to a variety of client devices (206-1 through 206-5) in accordance with the techniques described herein. Content service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Client devices 206 may be any suitable device capable of connecting to network 204 and consuming content provided by service 202. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices, etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular protocols herein are merely by way of example. Suitable alternatives known to those of skill in the art may be employed.

In the following examples and for the sake of simplicity, content service 202 is described as if it were integrated with the platform(s) that provides the video content to client devices. Alternatively, content service 202 may provide access to video content in conjunction with one or more content delivery networks (e.g., CDN 214) that may or may not be independent of content service 202. The range of variations known to those of skill in the art are contemplated to be within the scope of this disclosure.

Some of the implementations enabled by the present disclosure contemplate logic resident on the client devices consuming content from content service 202; such logic being configured to make decisions in conjunction with consuming the video content including, for example, selection of the initial bit rate. The logic might be part of a variable bit rate algorithm or implemented to work in conjunction with such an algorithm. The logic might be implemented, for example, in a media player on the client device or as a separate application resident on the client device. However, it should be noted that implementations are also contemplated in which content service 202 includes logic that facilitates at least some aspects of the delivery of content as described herein (e.g., as represented by initial bit rate selection logic 210). For example, such logic might determine or discover a download time for the client device and provide the client device with a suitable initial bit rate as determined according to the techniques described herein.

Content service 202 may also include the content (including associated manifest files), e.g., in data store 212, to which service 202 provides access. Alternatively, the video content may be provided and/or hosted by one or more separate platforms, e.g., CDN 214. It should be noted that, while logic 210 and data store 212 are contemplated as integrated with content service 202, implementations are contemplated in which either or both operate remotely from the associated content service, and/or either or both are under the control of an independent entity.

In some cases, content service 202 may provide or be in control of both the video content and the page content with which the video content is associated or integrated. For example, if content service 202 is a video-on-demand service as described above with reference to FIG. 1, the service home page and the video content that is part of that page might come from or be under the control of the same source; possibly operating in conjunction with another platform (e.g., CDN 214). In another example in which the video content is advertising content served on a web page, the video content might come from one source (e.g., service 202 and/or CDN 214) while the web page might come from another (e.g., a web site as represented by server 216). In yet another example, video content that is integrated with a user's social network feed might come from a variety of sources. From these examples, those of skill in the art will understand the great diversity of use cases to which the techniques described herein are applicable.

Figure 3:
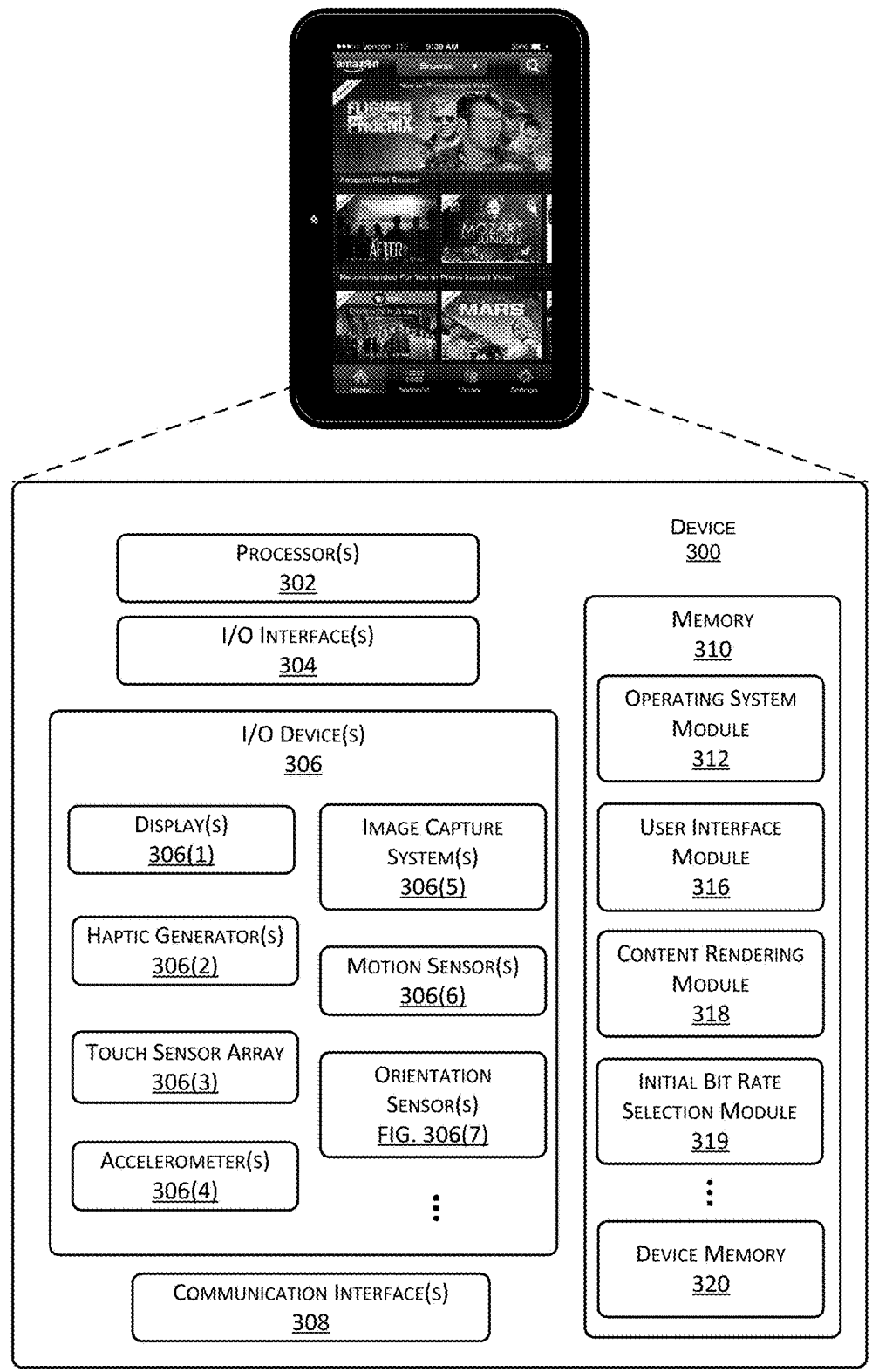
FIG. 3 is a simplified block diagram of an example of a client device with which various implementations may be practiced.

A block diagram of an example of a client device 300 suitable for use with various implementations is shown in FIG. 3. Device 300 includes one or more single or multi-core processors 302 configured to execute stored instructions (e.g., in device memory 320). Device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface, and so forth. I/O interface(s) 304 is coupled to one or more I/O devices 306. The I/O device(s) 306 may include one or more displays 306(1), one or more haptic generators 306(2), a touch sensor array 306(3), one or more accelerometers 306(4), one or more image capture systems 306(5), one or more motion sensors 306(6), one or more orientation sensors 306(7), microphones, speakers, and so forth. The one or more displays 306(1) are configured to provide visual output to the user and may comprise any of a variety of display types including, for example, any type of reflective or transmissive display. Touch sensor array 306(3) any of a variety of arrays configured to determine the location, duration, speed and direction of touch events on or near the device's display.

Device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Device 300 also includes one or more buses or other internal communications hardware or software that allow for the transfer of data and instructions between the various modules and components of the device.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content rendering module 318, and other modules. Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of video content. In some implementations, a portion of device memory 320 may be distributed across one or more other devices including servers, network attached storage devices, and so forth.

The logic or computer program instructions used to support initial bit rate selection as described herein (represented by initial bit rate selection module 319) may be implemented in a variety of ways. For example, at least some of this functionality may be implemented as part of the code of a media player operating on device 300. Alternatively, module 319 may be implemented separately from the device's media player. And as mentioned above, implementations are contemplated in which at least a portion of the logic or computer program instructions may reside on a separate platform, e.g., service 202, CDN 214, server 216, etc. Suitable variations and alternatives will be apparent to those of skill in the art. It will also be understood that device 300 of FIG. 3 is merely an example of a device with which various implementations enabled by the present disclosure may be practiced, and that a wide variety of other devices types may also be used (e.g., devices 206-1 to 206-5). The scope of this disclosure should therefore not be limited by reference to device-specific details.

Figure 4:
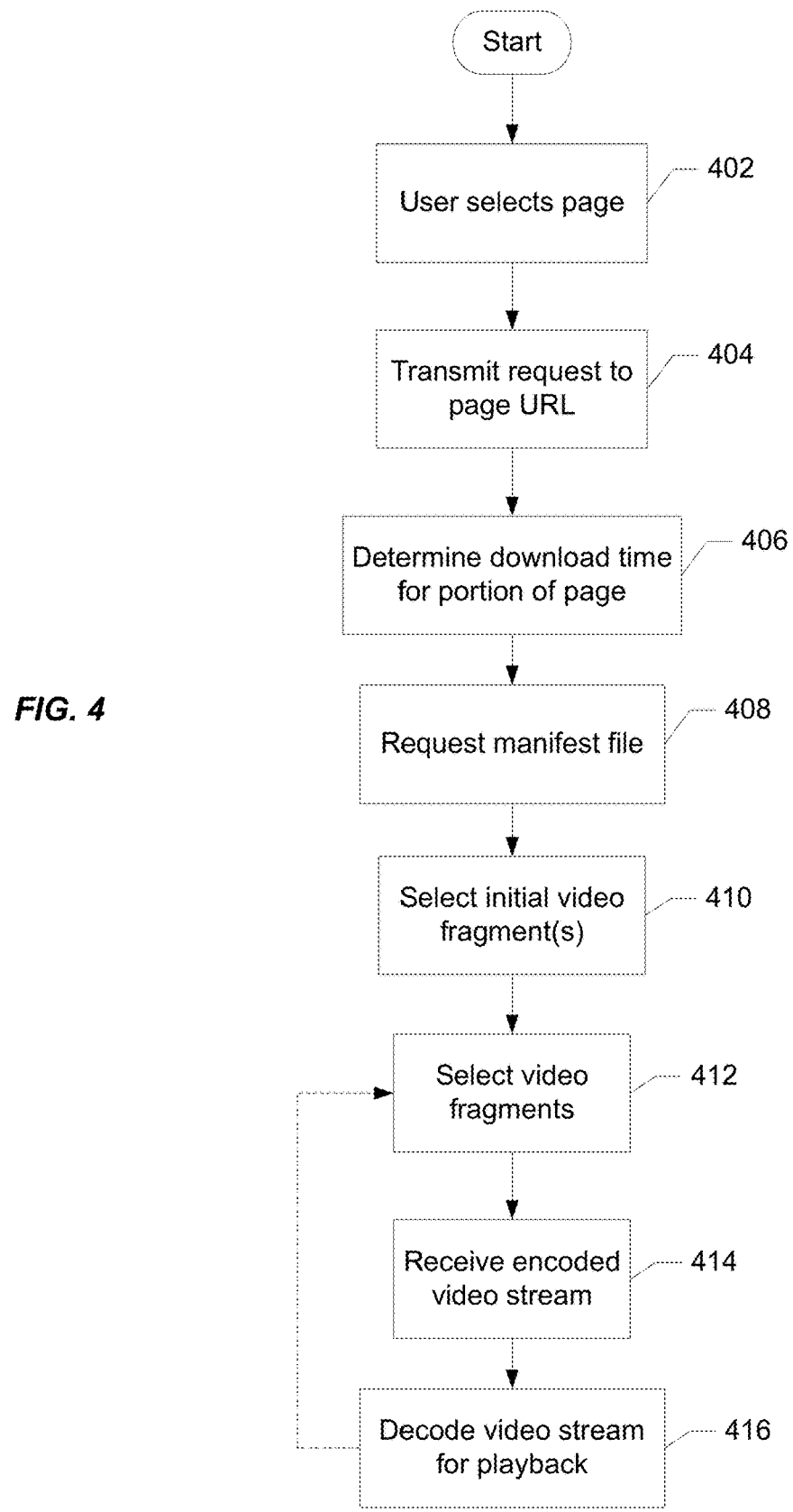
FIG. 4 is a flowchart illustrating operation of a particular implementation.

The delivery of video content to a client device according to a particular implementation is illustrated in the flow chart of FIG. 4. This and other examples described herein assume the use of H.264 encoding for the video content. However, it will be understood that the basic principles described herein may be employed with any of a variety of codecs including, for example, MPEG-1, MPEG-2, MPEG-4 Part 2, VC-1, H.263, VP8, VP9, Daala, and H.265 (also commonly referred to as HEVC). The techniques described herein may also be used with any of a variety of variable bit rate techniques. The example illustrated by FIG. 4 also assumes a media player on the client device that includes logic (e.g., module 319) configured to determine the initial bit rate with which video is delivered as described herein. This example also assumes that the video content is presented in conjunction with a requested web page, e.g., as an advertisement or embedded video content. Again, these details are merely presented by way of example.

When a user requests a web page (e.g., by selecting a link on the display of a client device) (402), the client device sends a request for the web page to the address corresponding to the URL represented by the link (404). The initial bit rate logic (e.g., logic 210 or module 319) determines a download time required to download a portion of the requested page (406), e.g., the above-the-fold content. As described above, this download time represents an estimate of the bandwidth available to the client device.

The client device transmits a request (e.g., generated by the device's media player) for the manifest file for the video content associated with the requested page (408). As will be understood, the manifest file includes information relating to the video content that allows the client device's media player to generate properly formatted requests for specific fragments of the content. For a particular segment of the content, the manifest file will typically identify a number (e.g., 8-15) of different options for fragments that may be requested for playback of that segment. The fragments for a given content segment represent a variety of different bit rates and may be of different sizes, for different streaming protocols, for different display resolutions, etc.

The client device then uses the download time for the portion of the page content to guide selection of the initial fragment(s) for the video content from the manifest file (410). In particular, this information is used to select the fragment(s) that represent(s) a bit rate that is within the bandwidth estimate represented by the download time. This may correspond, for example, to the highest bit rate fragment(s) within the bandwidth estimate, but may also be lower bit rate versions. Such a lower bit rate version might be selected to satisfy additional constraints (e.g., a time within which the playback of the video content must begin). And the mapping between the download time and the initial bit rate selection may be achieved in a variety of ways.

For example, the measured download time might index into a table that maps download time ranges to bit rates. The bit rate to which the download time maps might then be provided as input to the media player which selects the initial video fragment(s) for playback that correspond(s) to a bit rate that is less than or equal to the input bit rate. In another example, the actual number of bits corresponding to the above-the-fold content might be divided by the download time, resulting in a bit rate that may then be provided as input to the media player. The media player itself could also be configured to perform these operations rather than receive the result as an input. Other suitable variations will be apparent to those of skill in the art.

In addition, it should be understood that the content to which the download time corresponds need not necessarily be the above-the-fold content of a web page as described in this example. That is, while the above-the-fold content is a useful unit of content for the use case involving an advertising video on a web page, other use cases are contemplated in which different units of content might be more appropriate. For example, implementations are contemplated in which the content corresponding to the download time relates to some meaningful division of the downloaded content that does not relate to the size of the display of the client device. For example, the download time for the whole page (e.g., both above and below-the fold content) might be suitable. Alternatively, the download time could be measured for a fixed number of bits. The unit of content could also be designated within the requested page itself by, for example, inserting some kind of marker or script in the page HTML that indicates the size of the downloaded content or triggers capture of the download time.

The estimate of available bandwidth may also be determined using download times for multiple pieces of content. For example, download times might be determined for different portions of a requested page or for successive pages requested during a browsing session with a bandwidth estimate being averaged and/or updated over the session so that when video content is encountered, the current estimate of available bandwidth can be used to guide selection of the initial bit rate. As will be appreciated, these multiple data points might serve to provide a more reliable bandwidth estimate.

In another example, some web pages are presented using the so-called "infinite scroll" techniques (i.e., the pre-fetching of content from a subsequent page and adding it directly to a current page as the user scrolls). In this context, embedded video content might exist well below the initial above-the-fold portion of the content, or there might be multiple videos integrated at various points in the continuously presented pages (e.g., as in a social media feed). In such use cases, it might be useful to measure the download time for content up to the point where a video is encountered, or for some amount of content between successive videos. Again, multiple data points may be derived for such an "endless" page to get a more reliable and/or current estimate of available bandwidth for each successive video. More generally, any portion of some unit of content that is downloaded close in time to when the playback of associated video content begins may be used to measure one or more download times for the purpose of selecting an initial bit rate for playback of the video content as described herein. Suitable variations will be understood by those of skill in the art.

Returning to the flowchart of FIG. 4, the client device's media player then continues to select/request video fragments for playback using the manifest file (412), e.g., in accordance with a variable bit rate technique. The resulting encoded video stream including the requested fragments is then received (414) and decoded for playback on the client device's display (416).

According to various implementations, additional information may be used to inform selection of the initial bit rate. For example, a mobile device might get different bandwidth performance at different times of day, for different telecommunications carriers, and/or in different geographic locations. This information can be tracked and/or aggregated over time so that they can be used individually or in combination to influence initial bit rate selection. For example, a lower initial bit rate might be selected for a given time of day and/or location than might otherwise be selected based on the current estimate of available bandwidth. In another example, a higher bit rate might be selected for a particular carrier whose performance for a given geographic location is typically good.

Implementations are also contemplated in which the video content is not necessarily integrated with the downloaded content that represents the bandwidth estimate. That is, as described above, some implementations relate to initial bit rate selection for video content that is presented in the context of the page from which the bandwidth estimate is derived. However, other implementations are contemplated in which the relationship between the video content and the downloaded content is not so close. For example, the downloaded content might be part of an interface to a video-on-demand service in which a user might select a link to a video to initiate playback in a subsequently presented interface. In another example, the downloaded content might be part of a social media feed that includes a link to a video on another site. Other variations within the knowledge of those of skill in the art are within the scope of this disclosure.

While the subject matter of this application has been particularly shown and described with reference to specific implementations thereof, it will be understood by those skilled in the art that changes in the form and details of the disclosed implementations may be made without departing from the spirit or scope of this disclosure. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of this disclosure should not be limited by reference to such advantages. Rather, the scope of this disclosure should be determined with reference to the appended claims.

What is claimed is:

1. A device, comprising:
   memory;
   a display; and
   one or more processors configured to:
      request a page from a remote platform, the page having a video content reference integrated therewith;
      download an above-the-fold portion of the page, the page being configured for presentation of video content;
      determine a download time for the downloaded above-the-fold portion of the page;
      determine an initial bit rate for an adaptive bit rate technique based on the download time for the downloaded above-the-fold portion of the page;
      request a manifest file corresponding to the video content, the manifest file identifying a set of video fragments for each segment of the video content, each set of the video fragments including different-bit-rate versions of the corresponding segment of the video content;
      using the initial bit rate for the adaptive bit rate technique, request an initial one of the video fragments corresponding to an initial segment of the video content;
      request subsequent video fragments corresponding to subsequent segments of the video content using the adaptive bit rate technique;
      receive an encoded video stream including the requested video fragments; and
      decode the encoded video stream for playback on the display in association with presentation of the page that includes the downloaded above-the-fold portion of the page on which determination of the initial bit rate is based.

2. The device of claim 1, wherein the one or more processors are configured to select the initial video fragment with reference to a current geographic location of the device and previous bandwidth data associated with the current geographic location.

3. The device of claim 1, wherein the one or more processors are configured to select the initial video fragment with reference to a current geographic location of the device and carrier performance data associated with the current geographic location.

4. The device of claim 1, wherein the above-the-fold portion of the page includes a still image representing the video content.

5. A computer-implemented method, comprising:
   downloading a portion of a page, the page being configured for presentation of video content;
   determining a download time for the downloaded portion of the page;
   determining an initial bit rate for an adaptive bit rate technique based on the download time for the downloaded portion of the page;
   requesting a manifest file corresponding to the video content, the manifest file identifying a set of video fragments for each segment of the video content, each set of the video fragments including different-bit-rate versions of the corresponding segment of the video content;
   using the manifest file and the initial bit rate for the adaptive bit rate technique, selecting an initial video fragment corresponding to an initial segment of the video content;
   selecting subsequent video fragments corresponding to subsequent segments of the video content using the adaptive bit rate technique; and
   facilitating playback of the initial video fragment and the subsequent video fragments in the page that includes the downloaded portion of the page on which determination of the initial bit rate is based.

6. The method of claim 5, wherein the initial video fragment represents an estimate of available bandwidth represented by the download time.

7. The method of claim 5, wherein the portion of the page comprises an above-the-fold portion of the page.

8. The method of claim 5, wherein selecting the initial video fragment is done with reference to previous bandwidth performance data associated with one or more of a current geographic location, a telecommunications carrier, or a current time of day.

9. The method of claim 5, wherein the video content is presented separately from the page.

10. The method of claim 5, wherein the video content is integrated with the page.

11. The method of claim 5, wherein the page has second video content associated therewith, the method further comprising:
   downloading a second portion of the page;
   determining a second download time for the downloaded second portion of the page;
   determining a second initial bit rate for the adaptive bit rate technique based on the second download time;

using the second initial bit rate for the adaptive bit rate technique, selecting an initial video fragment of the second video content; and facilitating playback of the initial video fragment of the second video content in the page.

12. The method of claim 5, further comprising iterating determination of the download time for multiple portions of one or more pages to refine an estimate of available bandwidth, wherein selection of the video fragments is done based on the refined estimate of available bandwidth.

13. The method of claim 5, wherein determining the initial bit rate is also based on a startup time during which playback of the video content must begin.

14. A computer program product, comprising one or more non transitory computer-readable media having computer program instructions stored therein, the computer program instructions being configured such that, when executed by one or more computing devices, the computer program instructions cause the one or more computing devices to:

download a portion of a page, the page being configured for presentation of video content;

determine a download time for the downloaded portion of the page;

determine an initial bit rate for an adaptive bit rate technique based on the download time for the downloaded portion of the page;

request a manifest file corresponding to the video content, the manifest file identifying a set of video fragments for each segment of the video content, each set of the video fragments including different-bit-rate versions of the corresponding segment of the video content;

using the manifest file and the initial bit rate for the adaptive bit rate technique, select an initial video fragment corresponding to an initial segment of the video content;

select subsequent video fragments corresponding to subsequent segments of the video content using the adaptive bit rate technique; and facilitate playback of the initial video fragment and the subsequent video fragments in the page that includes the downloaded portion of the page on which determination of the initial bit rate is based.

15. The computer program product of claim 14, wherein the initial video fragment represents an estimate of available bandwidth derived from the download time.

16. The computer program product of claim 14, wherein the portion of the page comprises an above-the-fold portion of the page.

17. The computer program product of claim 14, wherein the computer program instructions are configured to cause the one or more computing devices to select the initial video fragment with reference to previous bandwidth performance data associated with one or more of a current geographic location, a telecommunications carrier, or a current time of day.

18. The computer program product of claim 14, wherein the page has second video content associated therewith, and wherein the computer program instructions are further configured to cause the one or more computing devices to:

download a second portion of the page;

determine a second download time for the downloaded second portion of the page;

determine a second initial bit rate for the adaptive bit rate technique based on the second download time;

using the second initial bit rate for the adaptive bit rate technique, select an initial video fragment of the second video content; and facilitate playback of the initial video fragment of the second video content in the page.

19. The computer program product of claim 14, wherein the computer program instructions are further configured to cause the one or more computing devices to iterate determination of the download time for multiple portions of one or more pages to refine an estimate of available bandwidth, and wherein selection of the video fragments is done based on the refined estimate of available bandwidth.

20. The computer program product of claim 14, wherein the computer program instructions are also configured to cause the one or more computing devices to determine the initial bit rate based on a startup time during which playback of the video content must begin.

* * * * *